(12) United States Patent
Williges

(10) Patent No.: US 6,705,586 B2
(45) Date of Patent: Mar. 16, 2004

(54) CONTROL VALVE

(75) Inventor: Martin Williges, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 406 days.

(21) Appl. No.: 09/913,247

(22) PCT Filed: Nov. 29, 2000

(86) PCT No.: PCT/DE00/04244
§ 371 (c)(1),
(2), (4) Date: Apr. 15, 2002

(87) PCT Pub. No.: WO01/44632
PCT Pub. Date: Jun. 21, 2001

(65) Prior Publication Data
US 2002/0121618 A1 Sep. 5, 2002

(30) Foreign Application Priority Data
Dec. 14, 1999 (DE) .......................... 199 60 190

(51) Int. Cl.⁷ .............................................. F16K 31/02
(52) U.S. Cl. .................................. 251/129.04; 123/41.1
(58) Field of Search .................. 251/129.04, 129.11, 251/129.15; 123/41.1

(56) References Cited

U.S. PATENT DOCUMENTS

| | | | | |
|---|---|---|---|---|
| 5,036,803 A | * | 8/1991 | Nolting et al. | 123/41.1 |
| 5,390,632 A | * | 2/1995 | Ikebe et al. | 123/41.1 |
| 5,404,842 A | * | 4/1995 | Matsushiro et al. | 123/41.1 |
| 5,749,330 A | * | 5/1998 | Inque et al. | 123/41.1 |
| 5,878,765 A | | 3/1999 | Lange | |
| 6,394,414 B1 | * | 5/2002 | Breitling et al. | 251/129.04 |

FOREIGN PATENT DOCUMENTS

| | | |
|---|---|---|
| DE | 33 03 102 A1 | 8/1984 |
| DE | 34 00 057 A1 | 9/1984 |
| DE | 32 00 457 C2 | 4/1985 |
| DE | 34 15 876 A1 | 10/1985 |
| DE | 39 00 866 A | 6/1990 |
| DE | 40 19 503 A1 | 1/1992 |
| DE | 41 09 498 A1 | 9/1992 |
| DE | 197 31 248 A1 | 1/1999 |
| EP | 0 165 195 A | 12/1985 |
| EP | 0 771 679 A | 5/1997 |
| EP | 0 820 886 A | 1/1998 |
| EP | 0 665 381 B1 | 9/1998 |
| EP | 0 874 147 A | 10/1998 |
| WO | 92/12474 | 7/1992 |
| WO | 98 54447 A | 1/2000 |

* cited by examiner

Primary Examiner—John Bastianelli
(74) Attorney, Agent, or Firm—Michael J. Striker

(57) ABSTRACT

A control valve (10) for a control circuit (30) having at least one first control unit (14) that, depending on at least one operating parameter and/or the ambient temperature, releases, throttles, or closes a branch of flow (32) to a heat exchanger (16), and controls a bypass line (34) in complementary fashion.

The control unit (14) generates a setpoint (36) for the position of a valve member (26) driven via electric motor or electromagnetically, which is processed by a second electronic control unit (20) integrated in the control valve (10) with a determined actual value (38) of the position of the valve member (26) to a position variable for the position of the valve member (26).

22 Claims, 3 Drawing Sheets

CONTROL VALVE

RELATED ART

The invention is based on a control valve according to the preamble of claim 1.

A thermostatic valve is often used in cooling circuits of internal combustion engines for vehicles to control the temperature. This valve comprises a valve body that is controlled by an expansion actuator depending on coolant temperature and releases or closes a branch of flow to a heat exchanger and adjusts a bypass line accordingly in complementary fashion so that the optimal operating temperature of the internal combustion engine is reached as quickly as possible and is kept constant. Such thermostatic valves are sluggish due to the slowly-proceeding heat transfer to the expansion actuator.

DE 41 09 498 A1 makes known a device and a method for controlling the temperature of an internal combustion engine of a motor vehicle. The cooling circuit of the internal combustion engine comprises a heat exchanger that can be circumvented by a bypass line. To control the coolant flow, a control valve is provided in the outlet region of the bypass line, the position of which is set using a control unit by way of a control line, so that more or less coolant can be directed past the heat exchanger. To this end, the control device specifies a temperature setpoint that is determined as a function of various operating conditions and operating parameters of the internal combustion engine. The setpoint is compared with the actual value of the engine temperature and a position variable for the control valve is formed from the result. A cooling fan that is assigned to the heat exchanger is also controlled by the control device by way of a separate line.

DE 197 31 248 A1 makes known a control valve that adjusts the inflow of coolant of an internal combustion engine of a motor vehicle into the heat exchanger of a heating system. It has a slide switch as a shutoff element and, as the drive, a permanent magnet arranged on the slide switch, which permanent magnet is situated in sliding fashion in the magnetic field of a drive coil that can be acted upon with the signal current in the positioning direction of the slide switch. The control valve is moved in the opposite direction by means of a return spring, so that it is steplessly adjustable depending on the size of the respective signal current contacting the drive coil.

In the known control valves, the valve setting is not detected and returned to the control unit, so that the respective valve position is not known. Since the most exact understanding possible of the flow rates in the individual branches of the cooling system is required for good control behavior of the entire thermomanagement, however, additional flow rate sensors are to be provided.

DE 3200457 C2 makes known a method and a device for controlling an electromagnetic setting element. In this method, the position of a valve is detected and taken into account in the control. The actual value and the setpoint of the control loop are brought together at a summation point, and the system deviation is sent to a PI amplification arrangement. Its output signal controls a pulse-duration modulator by way of a rectifier arrangement, by way of the output signals of which a voltage ramp generator can be switched on. The ramp signal is sent to two voltage-current converters, by way of which a corresponding current ramp is generated that acts upon two electromagnetic setting elements. The two electromagnetic setting elements can be solenoid valves, for example, by way of which a pneumatic or hydraulic pressure increase or decrease is controlled or regulated in a further setting element, whereby its position, as an actual value, can, in turn, be sent to the summation point.

EP 0 665 381 B1 makes known a hydraulically actuated armature having an electric drive motor, a pump, and a hydraulic switch a so-called compact unit. This can be a valve, for example, that is acted upon on both sides by pressure. A directional control of the valve is carried out by way of the reversal of the direction of rotation of the drive motor that drives the pump, which is situated inside the compact unit between the two connecting lines of the valve. As a result, the pump supplies the connecting lines with hydraulic fluid, depending on the direction of rotation. The drive motor is thereby controlled electrically by a central control unit. Located in the end positions of the valve setting element are limit switches that emit a signal that, on the one hand, interrupts the assigned electric conductor for the drive motor and, on the other, activates a control element of the central control unit. According to a further embodiment, the drive motors are controlled by means of a bus system, whereby the end positions are also detected by limit switches. For an application in a thermomanagement system it is much too inexact to detect only the end positions.

ADVANTAGES OF THE INVENTION

According to the invention, the control unit of a control circuit generates a setpoint for the position of a valve member driven via electric motor or electromagnetically, which is processed by a second electronic control unit integrated in the control valve preferably in the form of a microcontroller with a determined actual value of the position of a valve member to a position variable for the position of the valve member.

The control valve according to the invention is located in a master control circuit having a first control unit, such as a cooling circuit of an internal combustion engine. The second control unit, together with the control valve, forms a lower-level control circuit. The control valve therefore receives an inherent control intelligence and can take on these important functions in case of failure even without the master first control unit.

According to an embodiment of the invention, the first or second control unit is equipped with failure detection that switches to emergency operation on its own in the case of failure. In the normal case, only a limited data exchange with the first control unit is necessary, so that control lines can be spared. The connection to the master control unit is used primarily to input the setpoint for the position of the valve member in the microcontroller of the control valve.

Advantageously, the microcontroller is programmable for different valve characteristics, so that, as part of a shared component strategy, as many of the same components as possible can be used in different controls. For example, control valves can be used in motor vehicles in a simple design without thermomanagement and in a higher-quality design with thermomanagement. The possibility therefore also exists to first use a control valve as a single module with the option of upgrading it later to thermomanagement with an additional control device. It is also feasible to combine multiple control valves with a communication line and to couple various partial functions in this fashion, such as a cooler valve with a heating valve. It is also an advantage hereby that such systems are not exclusively reliant on a master control device, because, due to its inherent intelligence, expenditure for data transmission and time are spared.

The microcontroller integrated in the control valve is also capable of processing signals from external sensors. For instance, data from temperature sensors and/or pressure differential sensors can be sent to the microcontroller in a simple fashion by way of control lines, which, once it is evaluated, also act on the position variables to be determined. The control valve can therefore adjust a target temperature and/or a desired flow rate in a branch of flow to a heat exchanger on its own. A self-diagnosis of the control valve is also possible, the result of which can be sent to the first control unit.

In the normal case, the second control unit receives a setpoint for the position of the valve member from the first control unit by way of a signal line. In an embodiment of the invention, the setpoint is input as an analog signal, whereby this must be converted before evaluation in a digital processor using an analog-digital converter. An essential advantage of analog signals is the widespread use of the signal format, so that many instruments can be controlled with it.

In a further embodiment, the setpoint is input as a pulse width signal. This is a digital signal that, on the one hand, is easy to create and, on the other, can be evaluated without conversion. For use in the cooling circuit of an internal combustion engine, the high interference immunity and the simple possibility of detecting and eliminating a malfunction of the control is particularly advantageous. In a further embodiment, the setpoint is available as information via a CAN bus. The control valve is preferably connected to the CAN (Controller Area Network) bus in the motor vehicle for this purpose. Only one connection is required here, since the communication is carried out bidirectionally. This variant is particularly suited to an evaluation of the valve position in thermomanagement.

The setpoint input by the first control unit is compared with a determined actual value in the second control unit, a logical switch, or the microcontroller of the control valve, and processed to a position variable. The invention provides multiple variants for the determination of the actual value. On the one hand, for example, the actual value can be determined by way of a rotary potentiometer that is coupled with a drive axle of the valve member. This type of position detection is very simple. However, due to mechanical contact, it is sensitive to wear. A second variant uses inductive or capacitive displacement measurement, which is considerably more robust than the method mentioned previously. Angle determination can also be carried out in a magnetic fashion using GMR or AMR sensors (Giant Magneto Resistive; Anisotropic Magneto Resistive).

Finally, the actual value can be determined by measuring the light intensity of a light path. A very favorable variant is the incremental position detection of the actual value using a light barrier. Appropriately, the drive motor, a direct-current motor, thereby drives the valve member by way of a gear, whereby a gear wheel or a separate wheel on a drive part has markings that are detected by an optical sensor. The optical signals detected by the sensor form a measure of the motion of the valve member.

In order to obtain a reference point, a reference position must first be determined, on which the subsequent measurements are based. According to the invention, a mechanical stop is provided for this purpose. The optical sensor, which can be designed as a hybrid light barrier or a reflection light barrier, is connected with the second control unit by way of a data line. The signal sequence is detected in this. A certain signal sequence can be assigned to an exact position of the valve member, so that the exact position can be determined from a certain signal sequence.

Advantageously, this measurement is noncontact, so that no wear occurs. It is also very exact, since a self-diagnosis can be performed using simple means. For instance, a calibration procedure can be triggered inherently if optical signals fail to appear in a certain period of time.

DRAWING

Further advantages arise out of the following drawing description. Embodiments of the invention are shown in the diagrams. The diagram, the description, and the claims contain numerous features in combination. It is appropriate for the expert to also examine the features individually and combine them into additional logical combinations.

DESCRIPTION OF THE DESIGN EXAMPLES

Figure 1:
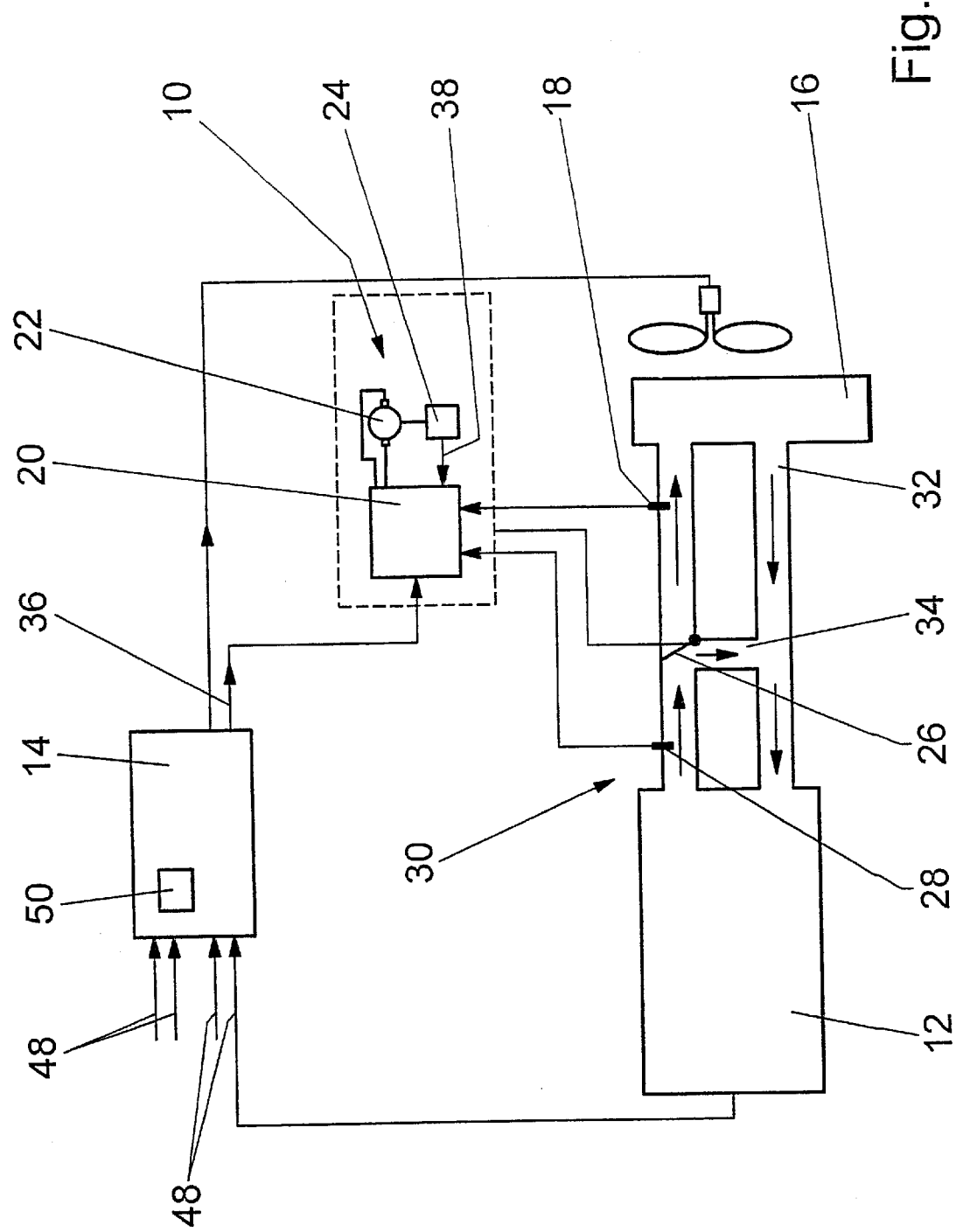
FIG. 1 shows a cooling circuit of an internal combustion engine having a control unit and a control valve according to the invention.

A cooling circuit 30 of an internal combustion engine is shown as the control circuit. It comprises a heat exchanger 16, which can be circumvented using a bypass line 34. To control the coolant flow, a control valve 10 is provided at the branching of the bypass line 34, the valve member 26 of which is shown as a door. This releases, throttles, or closes a branch of flow 32 to the heat exchanger 16 depending on control parameters, and controls a bypass line 34 in complementary fashion. The position of the valve member 26 is adjusted by way of a drive 22 preferably in the form of an electric direct-current motor or a proportionally acting electromagnet, which is controlled by a second control unit 20 (FIG. 1). This is integrated with a position measuring device 24, which delivers an actual value 38 for the position of the valve member 26, and a drive 22 in the control valve 10, so that the control valve 10 can be produced and tested as a self-supporting component.

The second control element 20 receives a setpoint 36 input from a first master control unit 14, which is responsible for the control of the entire cooling circuit. This is processed in the control unit 20 with the determined actual value 38 to a position variable for the valve member 26, so that this is adjusted by the drive 22 accordingly. The second control unit 20 appropriately has further inputs for additional sensors, such as a temperature sensor 28 and/or a pressure differential sensor 18. An additional security is thereby achieved for the determination of the position variable of the valve member 26 if the first control unit 14 fails and the second control unit 20 functions in self-supporting fashion. With such an application it is appropriate that a microcontroller be used as the second control unit 20. The control valve 10 therefore receives all important data directly and, due to its intelligence given as a result of the integrated microcontroller 20, is capable of adjusting the position of the valve member 26 on its own. As a result, the first control unit 14 can be eliminated in a simple design of the control of the cooling circuit of the internal combustion engine 12.

According to the invention, the setpoint 36, which is determined by a setpoint generator 50 of the first control device 14 that detects the operating parameters and ambient parameters of the internal combustion engine 12 as a function of input signals 48, and by stored characteristics or performance data, can be transferred as a digital signal preferably by way of a CAN bus, as an analog signal or pulse width signal to the second control device 20. With pulse width modulation, a pulse having variable length is specified with a certain, not necessarily constant frequency. The length of the pulse is assigned to a setpoint 36. For example, a pulse duration of 10 ms is used for a left stop, and a pulse duration of 20 ms is used for a right stop, while intermediate setpoints 36 are interpolated linearly. The failure of a pulse to appear over a certain time limit is interpreted as an error in the control and can serve as failure detection. The valve member 26 can then run in a predetermined, certain position, for example, or simply stand still. The desired position of the valve member 26 can be controlled simply, reliably, and with good resolution using digital control units having only one additional electric line.

Various variants are suited as position measuring device 24. For example, the actual value 38 can be determined by way of a generally common, inductive, capacitive, or magnetic displacement measurement. Likewise, the actual value 38 can be determined by measuring the light intensity of a light beam 62 in that an aperture partially separates the light beam 62 between a light source 60 and a sensor 64 depending on the position of the valve member 26. To this end, the aperture 66, which can be designed as a slotted disk or an eccentric disk, is connected with a drive element 68 of the valve member 26. Moreover, a rotary potentiometer, which, coupled with a drive element 58 of the valve member 26, can be used as position measuring device 24 and indicate the actual value 38.

Figure 2:
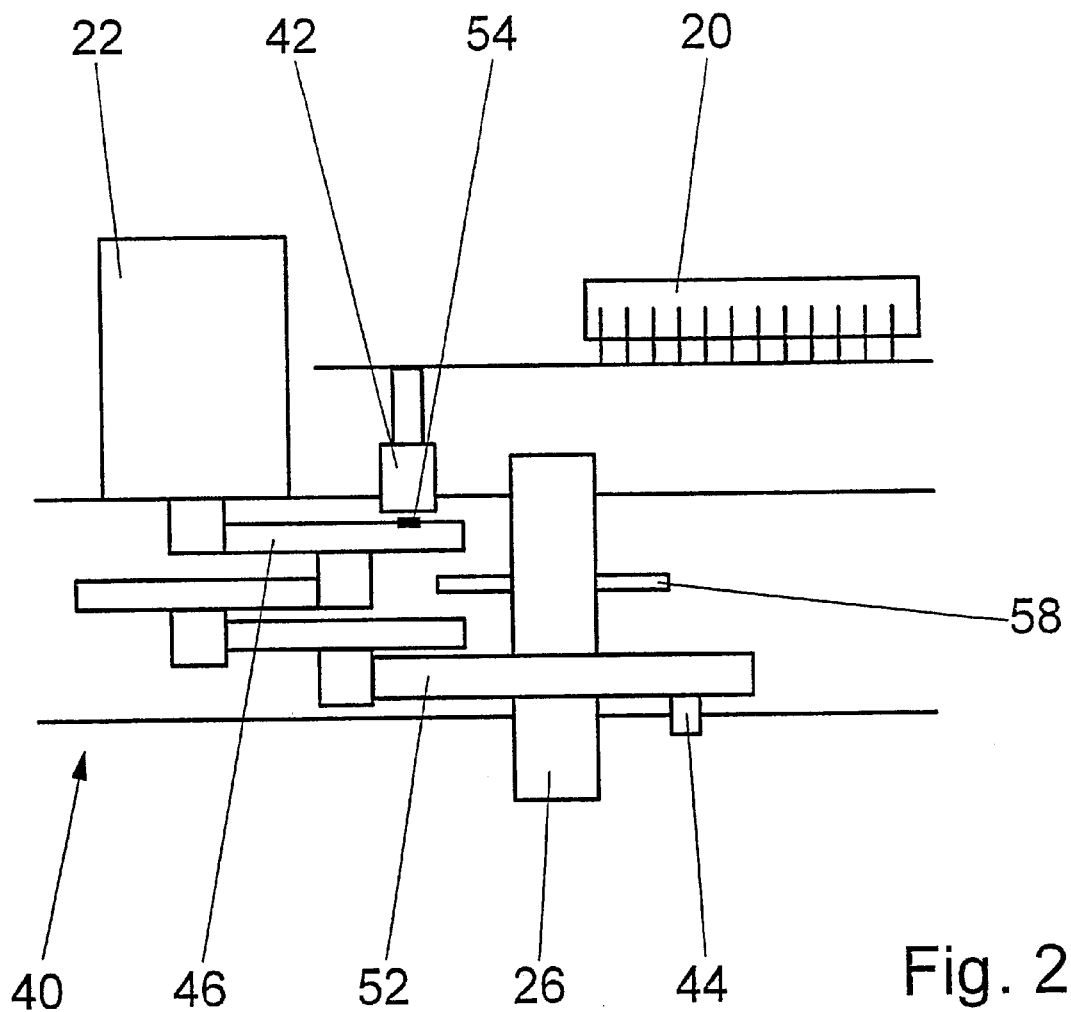
FIG. 2 shows a schematic drawing of a light barrier for incremental position detection.
Figure 3:
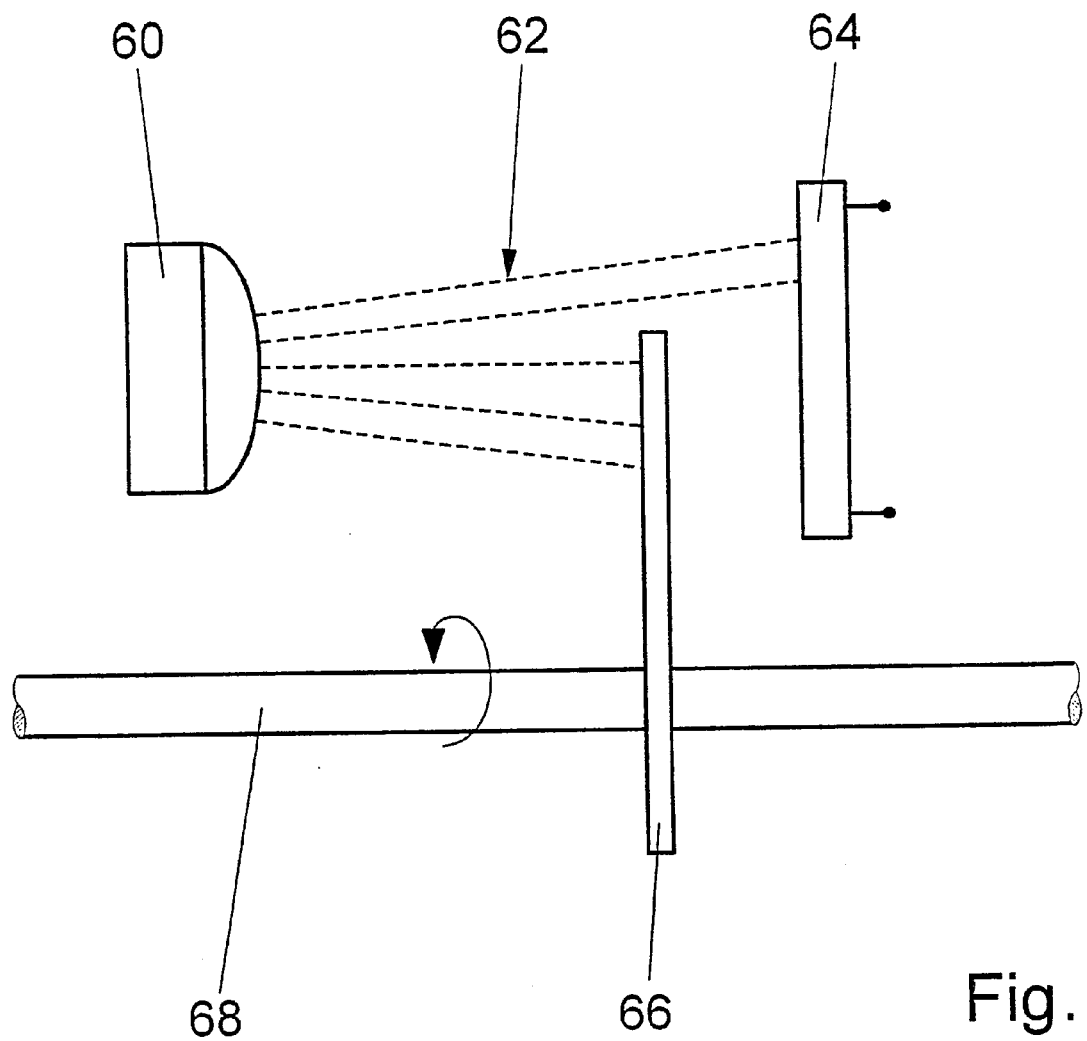
FIG. 3 shows a schematic position measuring device with an aperture.

In a further embodiment of the invention, the actual value 38 is determined via incremental position detection using a light barrier 42 (FIG. 2). In this design, the drive 22 drives the valve member 26 by way of a gear 40. Markings 54 are provided on a first gear wheel 46 connected directly with the drive 22, which markings are detected by a light barrier 42, e.g., a microreflecting light barrier, model SG2BC from the Kodenshi company. The marking 54 can also be applied to a separate disk 56 that is connected with a drive element 58 of the valve member 26 and cooperates with the light barrier 42.

The drive 40 comprises a further gear wheel 52 to which a pin 44 is attached. During start-up, the pin 44 is moved to a mechanical end stop not shown here. This serves as the reference point and is used to calibrate the control valve 10. In this position, the light barrier 42, which can be a hybrid light barrier or a reflecting light barrier, receives no impulses for a certain time.

The microcontroller 20 connected with the light barrier 42 evaluates this state as "stop reached" and references this position in a direction. If necessary, the entire procedure is repeated in the opposite direction. Desired positions can therefore be defined in simple fashion using impulse sequences received. In order to secure the setting of a working point over a longer time, a calibration procedure is triggered once a certain number of impulses is received and when the desired position of the valve member 26 is near a stop. In order to determine the position exactly, it is also important that the position of the valve member 26 not change if the drive 22 is dead. For this reason, it is appropriate to design the drive 40 to be nearly self-locking. Since the direction of rotation and/or the direction of movement of the valve member 25 cannot be readily determined with a single light barrier 42, the last control device of the drive 22 is used to decide which direction of rotation is present. To this end, it is necessary that the drive come to a standstill before it is switched in the direction. Otherwise, the assumed direction of motion of the drive 22 does not agree with the actual one for a short time in which the drive 22 is braked. The setting direction of the valve member 26 can also be determined by way of multiple light barriers arranged in the setting direction or by way of an absolutely coded, e.g, coded according to the Grey code, optical generator.

REFERENCE SYMBOLS

10 Control valve
12 Internal combustion engine
14 First control unit
16 Heat exchanger
18 Pressure differential sensor
20 Second control unit
22 Drive
24 Position measuring device
26 Valve member
28 Temperature sensor
30 Cooling circuit
32 Branch of flow
34 Bypass line
36 Setpoint
38 Actual value
40 Gear
42 Light barrier
44 Pin
46 Gear wheel
48 Input signal
50 Setpoint generator
52 Gear wheel
54 Marking
56 Disk
58 Drive element
60 Light source
62 Light beam
64 Sensor
66 Aperture
68 Drive element

What is claimed is:

1. Control valve (10) for a control circuit (30) having at least one first control unit (14) that, depending on one operating parameter and/or the ambient temperature, releases, throttles, or closes a branch of flow (32) to a heat exchanger (16), and controls a bypass line (34) in complementary fashion, characterized in that the control unit (14) generates a setpoint (36) for the position of a valve member (26) driven via electric motor or electromagnetically, which is processed by a second electronic control unit (20) integrated in the control valve (10) with a determined actual value (38) of the position of the valve member (26) to a position variable for the position of the valve member (26).

2. Control valve (10) according to claim 1, characterized in that the at least one control unit (14, 20) is equipped with failure detection and, in the case of a failure of the first control unit (14), switches to emergency operation, in which the second control unit (20) receives control signals from additional sensors.

3. Control valve (10) according to claim 1, characterized in that at least one of the control units (14, 20) can be programmed for different valve characteristics.

4. Control valve (10) according to claim 1, characterized in that the setpoint (36) is input as an analog signal.

5. Control valve (10) according to claim 1, characterized in that the setpoint (36) is input as a pulse width signal.

6. Control valve (10) according to claim 1, characterized in that the setpoint (36) is transmitted as digital information to the control valve (10) by way of a CAN bus.

7. Control valve (10) according to claim 1, characterized in that the actual value (38) is determined using a position measuring device (24) in the form of a rotary potentiometer that is coupled with a drive element (58) of the adjustable valve member (26).

8. Control valve (10) according to claim 1, characterized in that the actual value (38) is determined using a position measuring device in the form of a GMR or AMR sensor.

9. Control valve (10) according to claim 1, characterized in that the actual value (38) is determined via inductive or capacitive displacement measurement.

10. Control valve (10) according to claim 1, characterized in that the actual value (38) is determined via measurement of the light intensity of a light path, between which an aperture provides separation in a position-dependent fashion.

11. Control valve (10) according to claim 1, characterized in that the actual value (38) is determined via incremental position detection using a light barrier (42).

12. Control valve (10) according to claim 1, characterized in that the second control unit (20) is a microcontroller that evaluates signals from external sensors (18, 28) of the control valve (10) and uses them for control.

13. Control valve (10) according to claim 12, characterized in that an external temperature sensor (28) is provided as a sensor.

14. Control valve (10) according to claim 12, characterized in that an integrated pressure differential sensor (18) is provided as a sensor.

15. Control valve (10) according to claim 1, characterized in that it is coupled with multiple control valves located in one control circuit (30).

16. Control valve (10) according to claim 11, characterized in that a direct-current motor (22) adjusts the valve member (26) by way of a gear (40) that has markings (54) on a gear wheel (46) or a separate disk (56) that are detected by an optical sensor (42).

17. Control valve (10) according to claim 16, characterized in that the gear (40) is designed nearly self-locking.

18. Control valve (10) according to claim 16, characterized in that the optical sensor (42) is a hybrid light barrier or a reflection light barrier.

19. Control valve (10) according to claim 18, characterized in that multiple optical sensors (42) are provided.

20. Control valve (10) according to claim 16, characterized in that the gear (40) has a pin (44) on a further gear wheel (52) that serves as a stop to determine a reference position.

21. Control valve (10) according to claim 11, characterized in that the drive (22) comes to a stop in front of a direction commutator.

22. Control valve (10) according to claim 11, characterized in that an absolutely coded, optical generator is provided.

\* \* \* \* \*